(12) United States Patent
Lok et al.

(10) Patent No.: US 6,600,442 B2
(45) Date of Patent: Jul. 29, 2003

(54) PRECISION APPROACH RADAR SYSTEM HAVING COMPUTER GENERATED PILOT INSTRUCTIONS

(75) Inventors: Yuchoi Francis Lok, Framingham, MA (US); Steven R. Goncalo, Mansfield, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/899,393

(22) Filed: Jul. 5, 2001

(65) Prior Publication Data

US 2003/0016160 A1 Jan. 23, 2003

(51) Int. Cl.[7] .............................................. G01S 13/00
(52) U.S. Cl. ............................. 342/33; 342/35; 342/36; 342/38
(58) Field of Search .............................. 342/33, 34, 35, 342/36, 37; 701/3, 14, 16, 17

(56) References Cited

U.S. PATENT DOCUMENTS

| 3,907,223 A | | 9/1975 | Crane | |
|---|---|---|---|---|
| 3,949,399 A | | 4/1976 | Huber et al. | |
| 4,454,510 A | * | 6/1984 | Crow | 342/32 |
| 4,667,196 A | * | 5/1987 | Kaul | 340/948 |
| 4,893,815 A | * | 1/1990 | Rowan | 42/1.08 |
| 5,714,948 A | * | 2/1998 | Farmakis et al. | 340/961 |
| 5,907,568 A | * | 5/1999 | Reitan, Jr. | 342/181 |
| 6,124,898 A | | 9/2000 | Patel et al. | |
| 6,219,594 B1 | * | 4/2001 | Nicosia et al. | 340/972 |
| 6,311,108 B1 | * | 10/2001 | Ammar et al. | 244/180 |

FOREIGN PATENT DOCUMENTS

WO   98/22834   5/1998

OTHER PUBLICATIONS

Reitan, E.H., "Computer graphics in an automatic aircraft landing system," National Computer Conference, 1976, pp. 689–700.
PCT Search Report; PCT Application No.: PCT/US02/19141; International Filing Date: Jun. 17, 2002; 6 pages.

* cited by examiner

Primary Examiner—Thomas H. Tarcza
Assistant Examiner—Isam Alsomiri
(74) Attorney, Agent, or Firm—Daly, Crowley & Mofford, LLP

(57) ABSTRACT

A computer generated pilot instruction system for providing spatial information to a pilot corresponding to the difference between the actual landing fight path and optimal landing flight path.

22 Claims, 13 Drawing Sheets

PRECISION APPROACH RADAR SYSTEM HAVING COMPUTER GENERATED PILOT INSTRUCTIONS

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to radar systems, and more particularly, to radar systems for aircraft.

BACKGROUND OF THE INVENTION

The use of radar for guiding aircraft to land and take off is well known in the art. A radar transmits signals and processes the signal returns to ascertain the heading and altitude of an aircraft approaching an airport. The radar information is used to maintain the aircraft at or near an optimal flight path for landing the aircraft. The level of reliance on radar can vary based upon the weather conditions. In cases where visibility is severely limited, a pilot can rely very heavily on radar information to land the aircraft.

In one type of landing system, known as Precision Approach Radar (PAR), a radar operator verbally guides the pilot along a landing course line and a landing glide slope, collectively called the landing flight path, based upon radar data. The PAR system presents the radar operator with a pair of two-dimensional displays. One display provides an aircraft course line in an azimuth display, and the other display provides an aircraft glide slope in an elevation display. The aircraft azimuth and elevation are plotted against range from the airport. On the two display formats, radar returns corresponding to the actual landing flight path of the aircraft are overlaid with lines depicting the optimal landing flight path of an aircraft at a particular runway. The optimal landing flight path may be different at different airports, or at the various runways at a particular airport, or from time to time depending upon weather conditions, or for different types of aircraft.

The PAR system operator evaluates the aircraft's position versus the optimal landing flight path using the azimuth and elevation radar displays and verbally informs the pilot via radio about the current position and trend of the aircraft relative to the optimal landing flight path. The verbal instructions typically include predefined terms, e.g., well above glide slope, slightly right of course line, on course, etc., to indicate the relative position of the aircraft. The pilot then adjusts engine speed and control surfaces, e.g., rudders, to conform to the optimal landing flight path based upon the radar operator's instructions.

While standardized terminology can be used, the meaning of the terms of the verbal flight instructions are imprecise and can vary from operator to operator. In addition, a given operator may subjectively vary the instructions over the landing process. For example, a PAR operator generally pays closer attention as the aircraft moves closer to the airport so as to provide finer control as the aircraft nears touchdown.

In addition, an operator's choice of radar display scale can also affect operator judgment. For example, a zoomed out display is typically used to provide initial guidance of an aircraft while far from the airport. In contrast, a zoomed in display, often used for aircraft close to the airport, is needed to provide fine resolution and fine flight path correction. It is relatively difficult for an operator to use the PAR terminology consistently for multiple zoom levels.

Another disadvantage associated with known PAR systems results from unprocessed radar measurements relative to the position of the radar. For safety reasons, the radar antenna is located at a predetermined distance from the touchdown point of the runway, often nearly a mile back from the touchdown point. For such an offset radar, the angular change indicated by the unprocessed radar data for an airplane exactly on a straight landing flight path is relatively large as the aircraft approaches touchdown. Where the optimal landing flight path is straight, unprocessed raw radar data indicates the optimal landing flight path as curved downward. Thus, to provide a more intuitive straight landing flight path display, the raw radar data is processed through coordinate transformations that have the effect of converting to Cartesian coordinates and re-positioning the coordinate origin at the touchdown point, thus making the optimal landing flight path appear straight on the radar displays.

Several factors degrade the radar accuracy for displayed points near the touchdown point. As described, the radar transmitter is physically offset from the touchdown point for safety reasons. The offset is both in the x direction, along the runway axis, and along the y direction, along an axis perpendicular to the runway. Because the radar transmitter is physically offset from the touchdown point, as the aircraft approaches the touchdown point the elevation angular accuracy, due to x axis offset, and the scan angle accuracy, due to y axis offset, both become increasingly dominant in the determination of the actual flight path of the aircraft. One of ordinary skill in the art will recognize that the elevation angular accuracy of a typical PAR radar system is about a tenth of a degree. A tenth of a degree elevation error results in a substantial percentage error in the reporting of the detected elevation of the aircraft as it approaches the touchdown point. One of ordinary skill in the art will also recognize that the radar scan angle width increases as the aircraft altitude decreases causing a reduction in the resolution of the radar near the touchdown point. Deviations from the flight path near the displayed touchdown point are scaled to less than a pixel on the display. Deviations of only a few pixels on a moving target can be difficult to detect by the radar operator.

Operator provided instructions have an inherent latency due to the time that is required for the operator to interpret the displayed radar information and make a decision as to what information should be given to the pilot. Such latency can cause the pilot to overcompensate or oscillate about the optimal flight path. Additionally, even with standard informational phrases, the transformation from the radar display to the verbal phrase is subjective, and thus, variable operator to operator.

Further, the radar operator is in a high stress environment. The operator must attempt to issue verbal information to the aircraft pilot at intervals of approximately 5 seconds as the aircraft approached landing. Under this stressful environment, inaccurate information may be issued by the operator.

It would, therefore, be desirable to provide a PAR landing system that presents standardized and consistent spatial information to a pilot during a landing approach.

SUMMARY OF THE INVENTION

The present invention provides computer generated pilot instructions during the landing process. With this particular arrangement, pilots receive objective landing instructions that eliminate operator inconsistencies and human limitations. While the invention is primarily shown and described in conjunction with landing aircraft, it is understood that the invention is generally applicable to systems in which it is desirable to provide computer generated information based upon the path of a moving object in relation to a desired path.

In one aspect of the invention, a method for automatically providing instructions to a pilot for landing an aircraft includes determining spatial information at a radar station that corresponds to a spatial difference between an actual landing flight path of the aircraft and an optimal landing flight path. The method further includes converting the spatial information to flight instructions and conveying the flight instructions to the pilot for enabling the pilot to correct the actual landing flight path to the optimal landing flight path.

The flight instructions to the pilot can be generated as synthesized voice flight instructions that correspond to the spatial information. The synthesized voice flight instructions are conveyed to the pilot to facilitate landing of the aircraft. The use of synthesized voice flight instructions provides spatial information to the pilot that is more consistent and more accurate than conventional voice information from a PAR radar operator.

In a further aspect of the invention, an apparatus for automatically generating pilot landing instructions includes means for computing a spatial difference between an actual landing flight path of the aircraft and an optimal landing flight path. The apparatus also includes means for converting the spatial information to flight instructions and conveying the flight instructions to the pilot for enabling the pilot to correct the actual landing flight path to the optimal landing flight path.

BRIEF DESCRIPTION OF THE DRAWINGS

The invention will be more fully understood from the following detailed description taken in conjunction with the accompanying drawings, in which.

DETAILED DESCRIPTION OF THE INVENTION

As used herein, the term instruction refers to information provided to a pilot indicating the position of an aircraft in relation to an optimal flight path. Also as used herein, the optimal landing glide slope refers to the optimal elevation for an approaching aircraft, and the optimal landing course heading refers to the optimal azimuth. The term optimal landing flight path refers collectively to both optimal landing glide slope and optimal landing course heading.

Figure 1A:
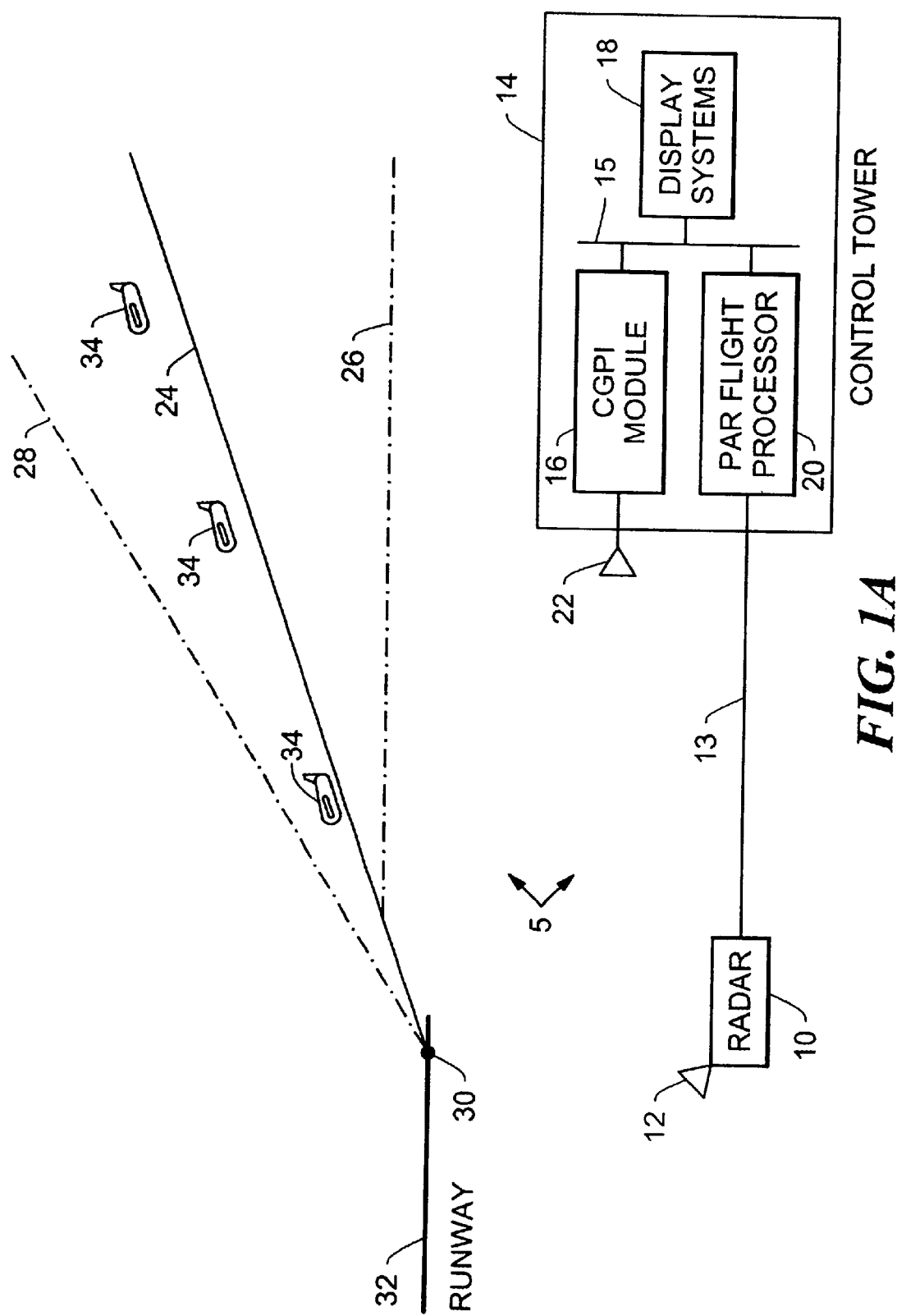
FIG. 1A is a schematic depiction of an exemplary computer generated pilot instruction (CGPI) system in accordance with the invention showing an aircraft landing approach from a side or elevation view.

FIG. 1A shows an exemplary computer generated pilot instruction (CGPI) system 5 in accordance with the invention illustrating an aircraft 34 landing approach from a side or elevation view. The aircraft 34 pilot is guided by the CGPI system 5 toward the optimal landing glide slope 24 via automatically generated synthesized voice flight instructions so that the aircraft will touchdown on a runway 32 at an optimal landing point 30. It should be noted that the several aircraft 34 are the same aircraft shown at different times in the landing approach. The outer landing glide path boundaries 26, 28 define the outer acceptable limits of a safe landing approach in elevation.

A CGPI radar 10 with a radar antenna 12 tracks the aircraft 34 position and sends raw radar data 13 to the control tower 14. The control tower 14 receives the raw data 13 and processes the raw data 13 with a PAR flight processor 20 for communication to a display system 18. A CGPI module 16 receives processed data via a data bus 15 connected to the PAR flight processor 20 and produces synthesized voice flight instructions for communication to the aircraft 34 with a radio antenna 22. The display systems 18 also receive processed data from the data bus 15 from the PAR flight processor 20 and can provide both PAR landing displays and text messages related to the synthesized voice flight instructions of the CGPI module 16.

Figure 1B:
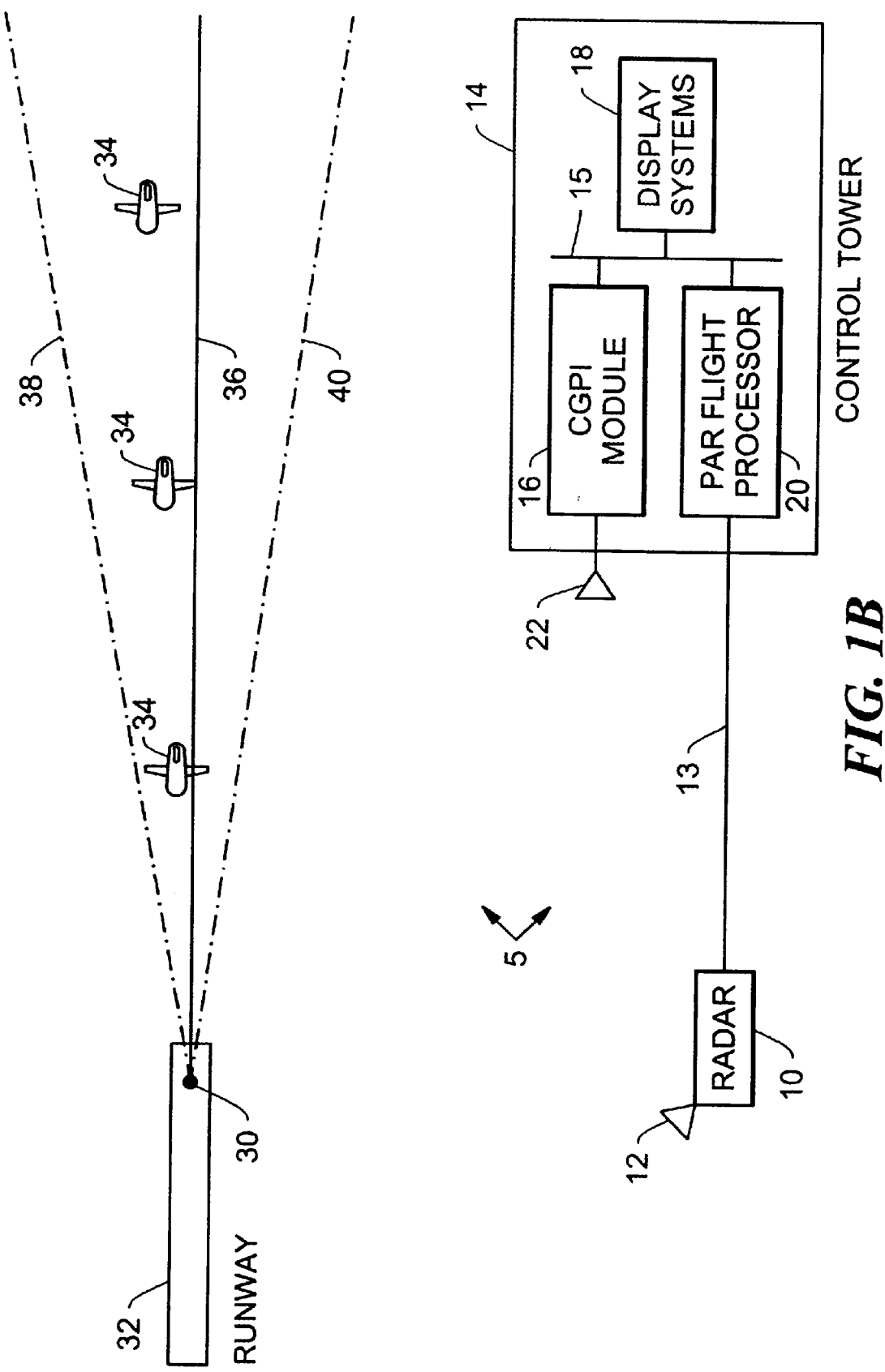
FIG. 1B is a schematic depiction of an CGPI system in accordance with the invention showing a landing approach from a top or azimuth view.

FIG. 1B shows a CGPI system 5 in accordance with this invention, showing a landing approach from a top or azimuth view. Aircraft 34 is guided by the CGPI system 5 toward the optimal landing course heading 36 so that it will touchdown on the runway 32 at the optimal landing point 30. Again, it should be noted that the several aircraft 34 are the same aircraft at different times in the landing approach. The outer landing azimuth boundaries 38, 40 define the outer acceptable limits of a safe landing approach in azimuth.

Figure 2A:
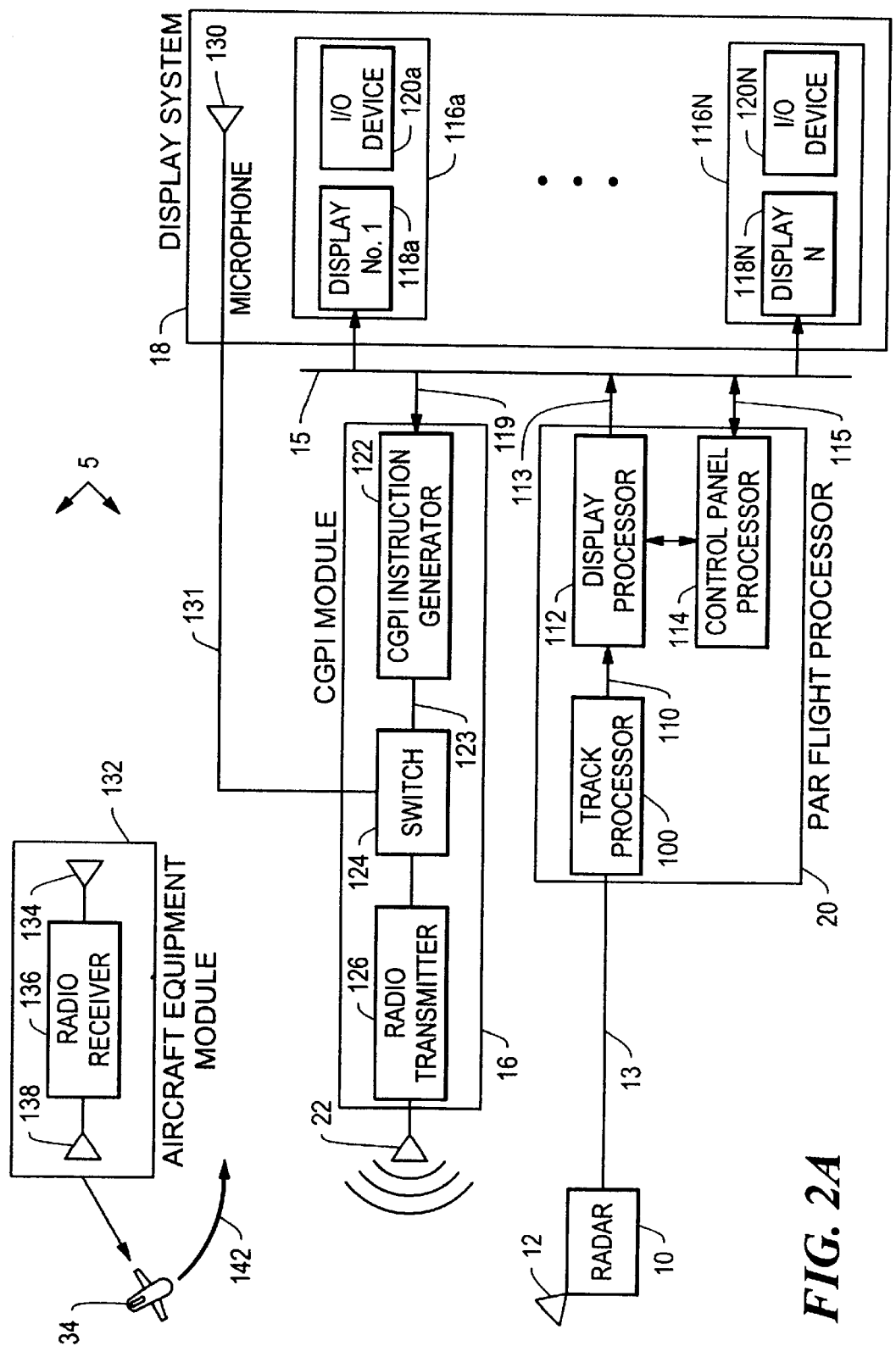
FIG. 2A is a block diagram showing further details of an exemplary CGPI system in accordance with the invention.

FIG. 2A is a block diagram of an exemplary CGPI system 5 in accordance with the invention. The CGPI system 5 includes a radar 10 with a radar antenna 12 that provides raw aircraft azimuth and elevation information 13 to a PAR flight processor 20. The radar 10 scans a coverage volume and produces raw measurements 13 of aircraft position in a manner well known to one of ordinary skill in the art. In an exemplary embodiment, the PAR flight processor 20 includes a track processor 100 for comparing the latest aircraft position data to data from previous scans to estimate the aircraft 34 position and velocity. The track processor 100 processes raw data 13 and provides data 110 to a display processor 112 that converts the aircraft position to Cartesian coordinates, for example, for display in elevation and azimuth.

Because the radar transmitter 10 and radar antenna 12 are offset from the aircraft touchdown point, the display processor 112 also performs transformations that place the displayed coordinate system origin at the optimal touchdown point 30, corresponding to the optimal point at which the aircraft would touch the runway upon landing. The transformed origin provides a graphical display that is more easily interpreted than that which would be provided by the raw radar positional data. Transforming a radar origin for display is well known to one of ordinary skill in the art.

The output of the display processor 112 provides data 113, via a data bus 15, to one or more graphical displays 118*a*-N. The graphical displays 118*a*-N present both azimuth and elevation displays to the radar operator as described below. Displays 118*a*-N can also provide automatically generated pilot instructions, which are described in detail below, on a display screen. The radar operator can modify the display range and resolution through an exemplary I/O device 120*a*-N, such as a keyboard. The I/O devices 120*a*-N can communicate back to the control panel processor 114 to alter the processing of the display processor 112 and thus make changes to the graphical display 118*a*-N.

The CGPI generator 122, within the CGPI module 16, receives transformed data 119 from data bus 15, interprets the data, and generates synthesized voice flight instructions 123 based upon an aircraft's position in relation to the optimal flight path. The synthesized voice flight instructions 123 are provided to a switch 124, which is under the control of the radar system operator via I/O devices 120*a*-N. In operation, the switch 124 is closed to connect the synthesized voice flight instructions 123 to a radio transmitter 126.

In one embodiment, upon radar operator command selection from the I/O device 120*a*-N, the radio transmitter 126 can instead be provided voice instructions 131 from microphone 130 to allow the radar system operator to suspend the transmission of synthesized voice flight instructions 123 and replace it with operator voice instructions 131.

The selected transmissions, either synthesized voice flight instruction 123, or voice instructions 131, are sent via radio transmitter 126 and radio antenna 22 to the aircraft 34 that contains an aircraft equipment module 132. The aircraft equipment module 132 includes a receiving antenna 134, a radio receiver 136 and an audio communication device 138 for audio communication to the pilot.

The synthesized voice flight instructions 123 can include a predetermined set of standardized phrases. In one embodiment, the synthesized voice flight instructions 123 include four classification groups or tags, each with seven sub-classifications, or classification sub-types. The sub-classifications correspond to the flight instructions issued to the aircraft. With this invention, synthesized voice flight instruction sub-classifications can be issued automatically by the CGPI instruction generator 122. The exemplary classifications and sub-classifications of synthesized voice instructions, each corresponding to an aircraft positional error or rate range, are given in Tables 1 though 4 below.

TABLE 1

Elevation Classification

| Elevation Error Lower Range Limit | Elevation Sub-Classifications (synthesized voice instructions) |
|---|---|
| WA | well above glide slope |
| A | above glide slope |
| SA | slightly above glide slope |
| OS | on glide slope |
| SB | slightly below glide slope |
| B | below glide slope |
| WB | well below glide slope |

TABLE 2

Elevation Rate Classification

| Elevation Correction Rate Lower Range Limit | Elevation Position | Elevation Correction | Elevation Rate Sub-Classifications (synthesized voice instructions) |
|---|---|---|---|
| CQ | above (below) | quickly descending (ascending) | correcting quickly |
| C | above (below) | descending (ascending) | correcting |
| CS | above (below) | slowly descending (ascending) | correcting slowly |
| H | on | near zero | holding |
| DS | above (below) | slowly ascending (descending) | diverging slowly |
| D | above (below) | ascending (descending) | diverging |
| DQ | above (below) | quickly ascending (descending) | diverging quickly |

TABLE 3

Azimuth Classification

| Azimuth Error Lower Range Limit | Azimuth Sub-Classifications (synthesized voice instructions) |
|---|---|
| WL | well left of course line |
| L | left of course line |
| SL | slightly left of course line |
| OC | on course line |
| SR | slightly right of course line |
| R | right of course line |
| WR | well right of course line |

TABLE 4

Azimuth Rate Classification

| Azimuth Correction Rate Lower Range Limit | Azimuth Position | Azimuth Correction Rate | Azimuth Rate Sub-Classifications |
|---|---|---|---|
| CQ | left (right) | quickly to right (left) | correcting quickly |
| C | left (right) | to right (left) | correcting |
| CS | left (right) | slowly to right (left) | correcting slowly |
| H | on | near zero | holding |
| DS | left (right) | slowly to left (right) | diverging slowly |
| D | left (right) | to left (right) | diverging |
| DQ | left (right) | quickly to left (right) | diverging quickly |

It will be recognized by one skilled in that the art that the flight instructions are not limited to those sub-classifications given in Tables 1 though 4. Any synthesized voice flight instructions contained in any number of messages are within the scope of this invention. In addition, in an exemplary embodiment, the language of the instructions can be selected by the user via the I/O devices 120a-N.

The range categories associated with sub-classifications in the above tables correspond to an amount of error from the optimal flight path. As will be described below, the particular synthesized voice flight instructions chosen to be sent to the aircraft are based upon the amount of flight path error. Let it suffice to say here that the CGPI instruction generator 122 automatically selects a grouping of the above sub-classifications to communicate to the aircraft by synthesized voice. The instructions are generated based upon the positional error of an approaching aircraft in relation to the optimum flight path, as are more fully described below.

The exemplary CGPI system uses groupings of flight instructions, each with two sub-classifications. For example, an exemplary synthesized voice flight instruction grouping is "well left of course line, diverging slowly." Typically two such groupings can be transmitted sequentially where one grouping corresponds to the sub-classifications of Tables 1 and 2 and the other corresponds to Tables 3 and 4. One of ordinary skill in the art will recognize that other groupings are within the scope of this invention.

In conventional PAR systems, the radar operator communicates voice messages to the aircraft at a rate that can vary over time and by operator. The radar operator subjectively determines and modifies the flight instructions based upon aircraft type.

In contrast, the CGPI system of the present invention generates synthesized voice flight instructions that can be communicated to the pilot at a consistent rate, e.g., five seconds. However, one skilled in the art will recognize that other instruction rates, fixed and variable, are within the scope of this invention. The CGPI system can provide messages at a consistent rate and/or a rate that consistently varies by aircraft position along the landing flight path. In addition, the CGPI system can automatically provide landing flight instructions appropriate for the type of aircraft, upon identification of the aircraft type by the radar system operator to the CGPI system using I/O devices 120a-N.

It will be recognized by one skilled in the art that the synthesized voice flight instructions 123 may be in any encoded form for transmission via the radio transmitter 126 and the radio antenna 22. If the synthesized voice flight instructions 123 are encoded, then the aircraft radio receiver 136 can provide a decoding function such that the synthesized voice flight instructions are presented to the pilot in decoded voice form by the audio device 138 in the aircraft.

Figure 2B:
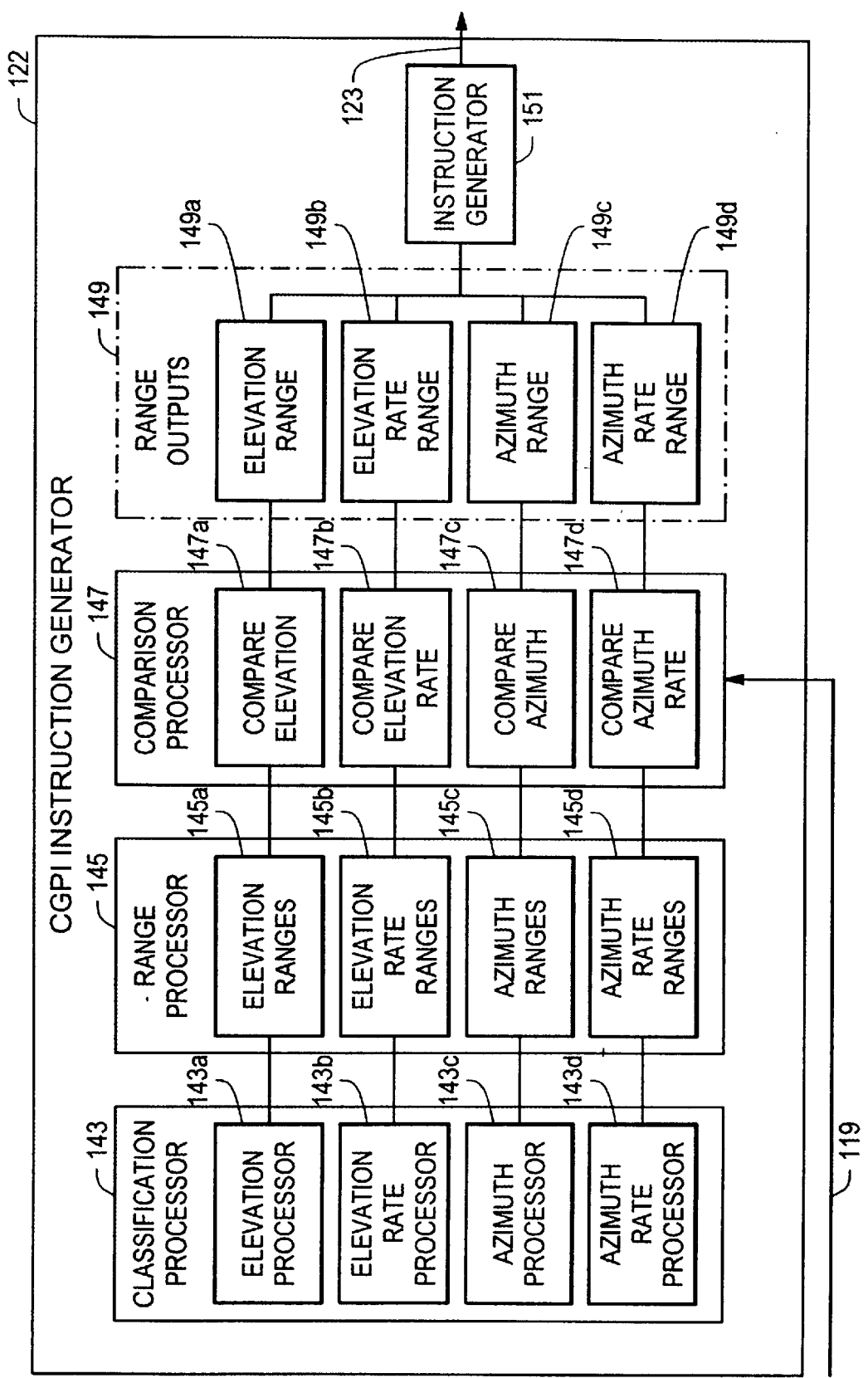
FIG. 2B is a block diagram of an exemplary CGPI instruction generator in accordance with this invention.

FIG. 2B is a block diagram of an exemplary CGPI instruction generator 122 in accordance with this invention. The exemplary CGPI instruction generator 122 includes a classification processor 143 that contains an elevation processor 143a, an elevation rate processor 143b, an azimuth processor 143c, and an azimuth rate processor 143d for arranging the aircraft positional or rate ranges into four classifications each with seven sub-classifications as indicated in Tables 1–4 above. It will be recognized by one skilled in the art that other arrangements of classifications and sub-classifications of aircraft positional and rate ranges are possible with this invention.

A range processor 145 establishes positional and rate ranges 145a–d associated with each of the sub-classifications. The ranges correspond to ranges of positional error and ranges of rates of closure relative to an optimal landing flight path that can be associated with an actual aircraft position. The positional ranges and rate ranges 145 can be different for different airports, weather conditions, and aircraft.

A comparison processor 147 compares that actual position of the aircraft, corresponding to input data 119 from the PAR flight processor (20 of FIG. 2A), to the ranges 145a–d established by the range processor 145. The comparison decisions will be further described in association with FIGS. 6–9. The comparison processor 147 provides four individual outputs 149a–d, one for each of the classification types 143a–d. An elevation range 149a, an elevation rate range 149b, an azimuth range 149c, and an azimuth rate range 149d indicate the sub-classification ranges within each of the four classifications 143a–d that best describe the actual position of the aircraft relative to an optimal landing flight path. Each of the four sub-classification ranges 149a–d are provided to the instruction generator 151 that provides synthesized voice flight instructions 123 corresponding to the four sub-classification ranges 149a–d.

Figure 3:
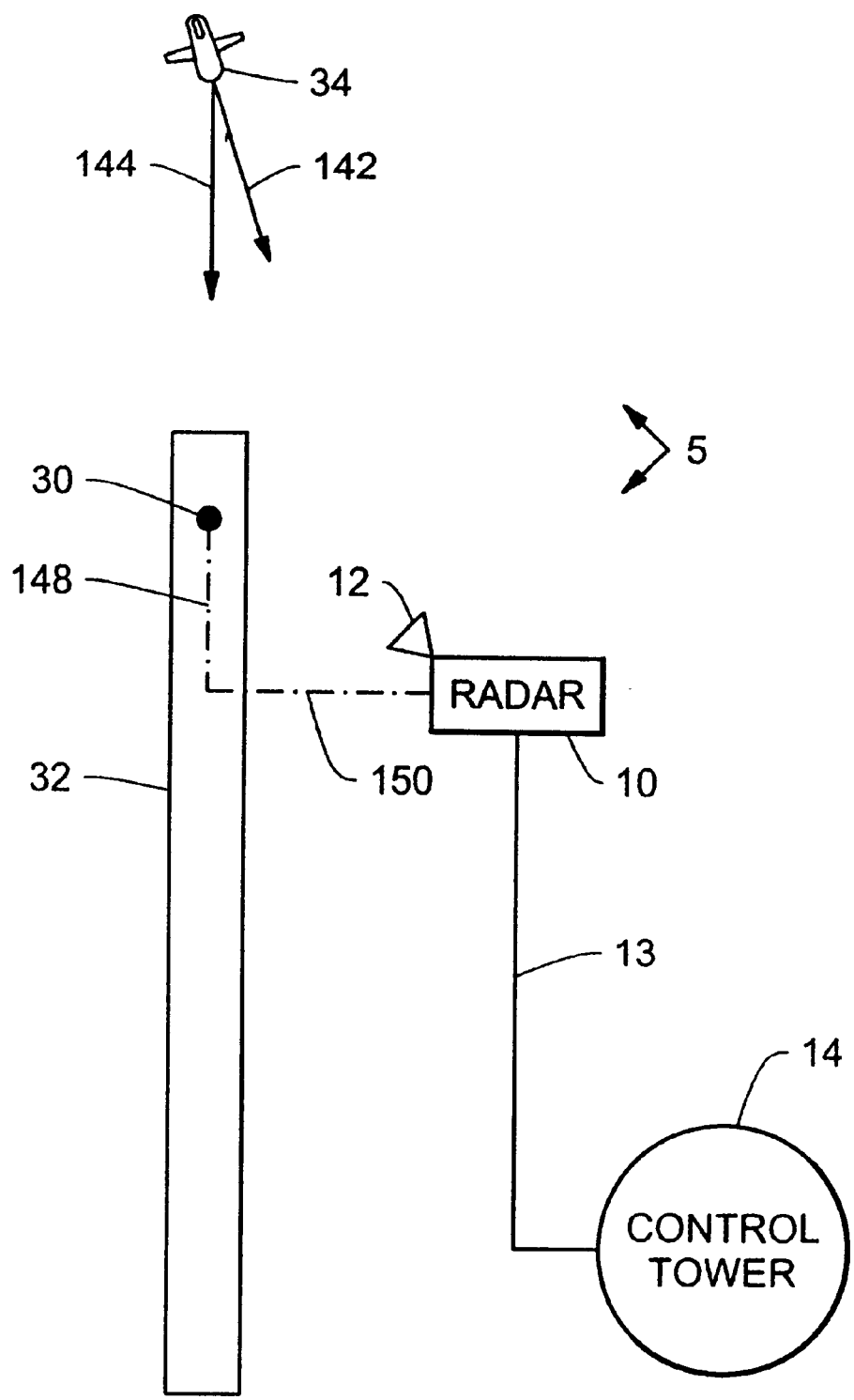
FIG. 3 is a schematic depiction of the CGPI system showing an exemplary location of a radar of the CGPI system in accordance with this invention.

FIG. 3 is a schematic depiction of the CGPI system 5 showing an exemplary location of a radar 10 and radar antenna 12. The radar 10 and radar antenna 12 are located at a position offset in two dimensions from the optimal touchdown point 30 on the runway 32. Offset in the y direction 150 and offset in the x direction 148 are corrected with data transformation by the PAR flight processor 20 located in the control tower 14. As described above, coordinate transformations allow the CGPI system radar display as shown in subsequent figures to use display axes on which the optimal touchdown point 30 is the origin of the axes. Using the touchdown point as the origin, rather than the position of the radar 10 and radar antenna 12, provides a display that is easier to interpret by the radar system operator.

Figure 4A:
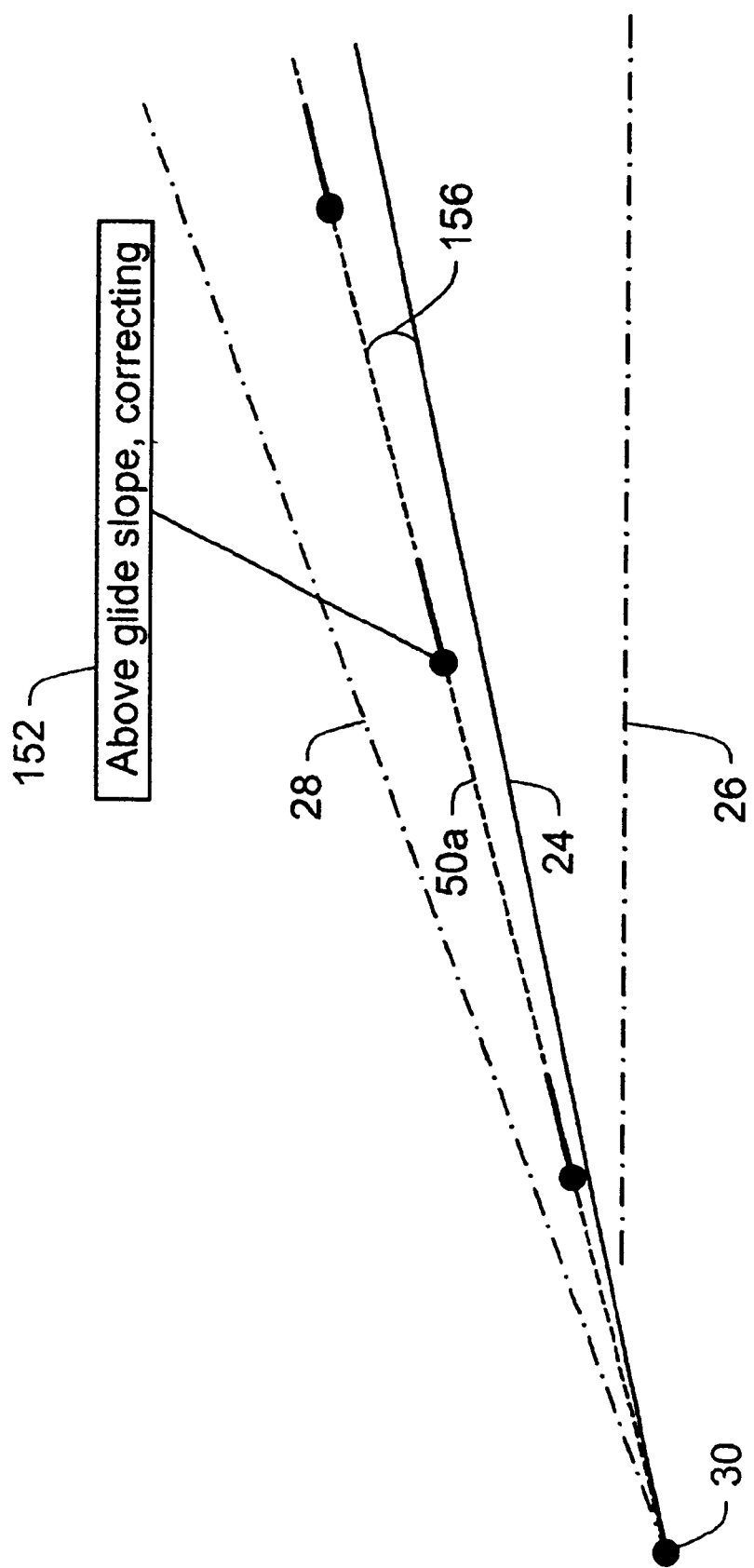
FIG. 4A depicts an exemplary radar display of an aircraft relative to an optimal landing glide slope in accordance with this invention.

FIG. 4A depicts an elevation (EL) radar display of an aircraft track symbol 50a relative to an optimal landing glide slope 24. The track symbol 50a can correspond to the aircraft 34 of FIGS. 1A–B. In one embodiment, the displayed optimal glide slope 24 can be adjusted manually by the operator or automatically adjusted based upon weather conditions, hazards, type of aircraft, or airport. Note that the optimal landing glide slope 24 is indicated as a straight line for user friendly viewing by the operator. The outer landing glide path boundaries 26, 28 define the outer acceptable limits of a safe landing approach in elevation. An aircraft landing flight path elevation error angle 156 is also shown.

Flight instruction label 152 corresponding to the elevation and elevation rate sub-classifications of Tables 1 and 2 and to the synthesized voice flight instructions 123 of FIG. 2A can be provided on the radar displays 118a-N as text attached to the conventional aircraft track symbol 50a. Alternatively, arrows or other ornaments can be added to the track symbol, and/or the track symbol can be color coded in correspondence to the synthesized voice flight instructions 123. It will be recognized by one skilled in the art that there are many forms by which the elevation and elevation rate synthesized voice flight instructions can be presented on the radar display.

Figure 4B:
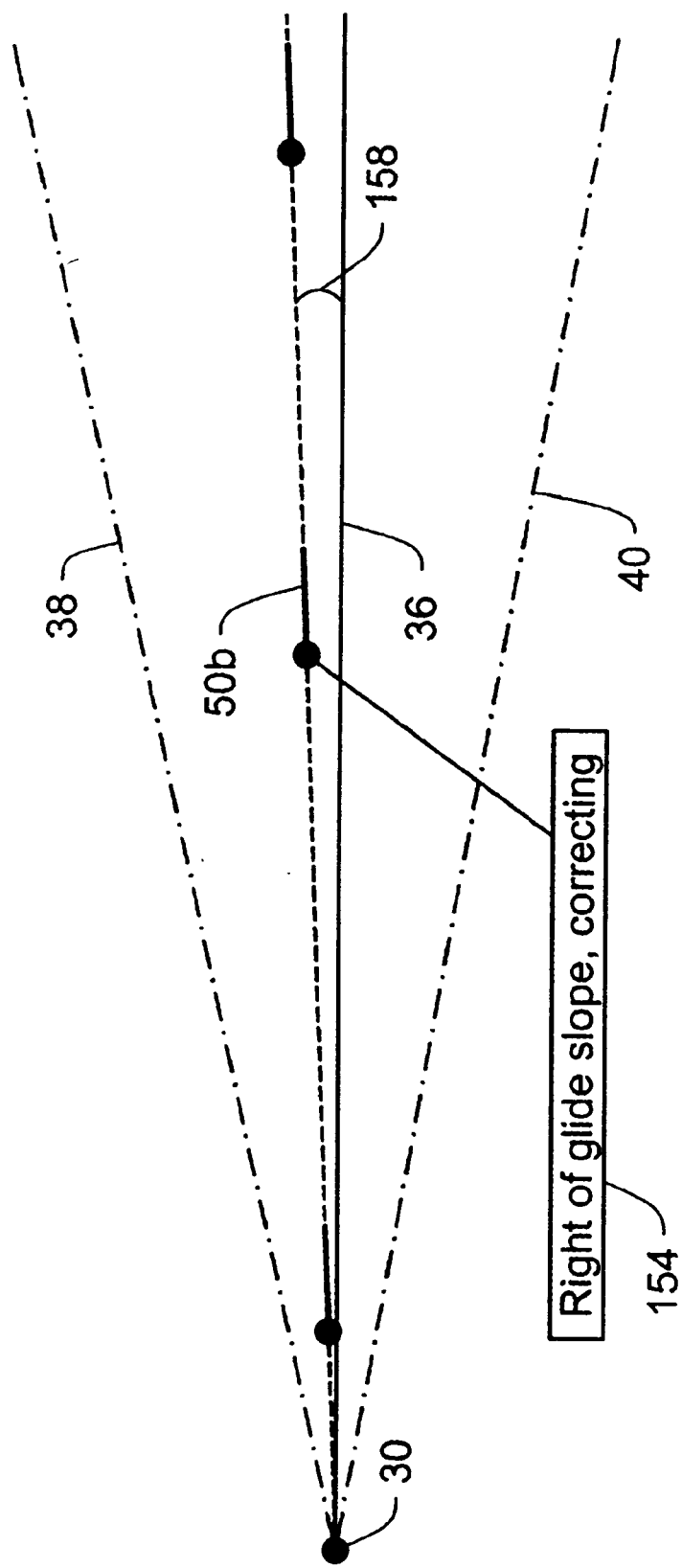
FIG. 4B depicts an exemplary radar display of an aircraft relative to an optimal landing course heading in accordance with this invention.

FIG. 4B depicts an azimuth (AZ) display of an aircraft with track symbol 50b relative to an optimal landing course heading 36. The optimal landing course heading 36 may be different at the various airports or it may be different from time to time based upon weather conditions. The outer landing azimuth boundaries 38, 40 define the outer acceptable limits of a safe landing approach in azimuth. An aircraft landing flight path azimuth error angle 158 is also shown.

Flight instruction label 154 corresponding to the azimuth and azimuth rate sub-classifications of Tables 3 and 4 and to the synthesized voice flight instructions 123 of FIG. 2A can be provided on the radar displays 118a-N as text attached to the aircraft track symbol 50b. As above, it will be recognized by one skilled in the art that there are many forms by which the azimuth and azimuth rate synthesized voice flight instructions can be presented on the radar display.

Figure 5A:
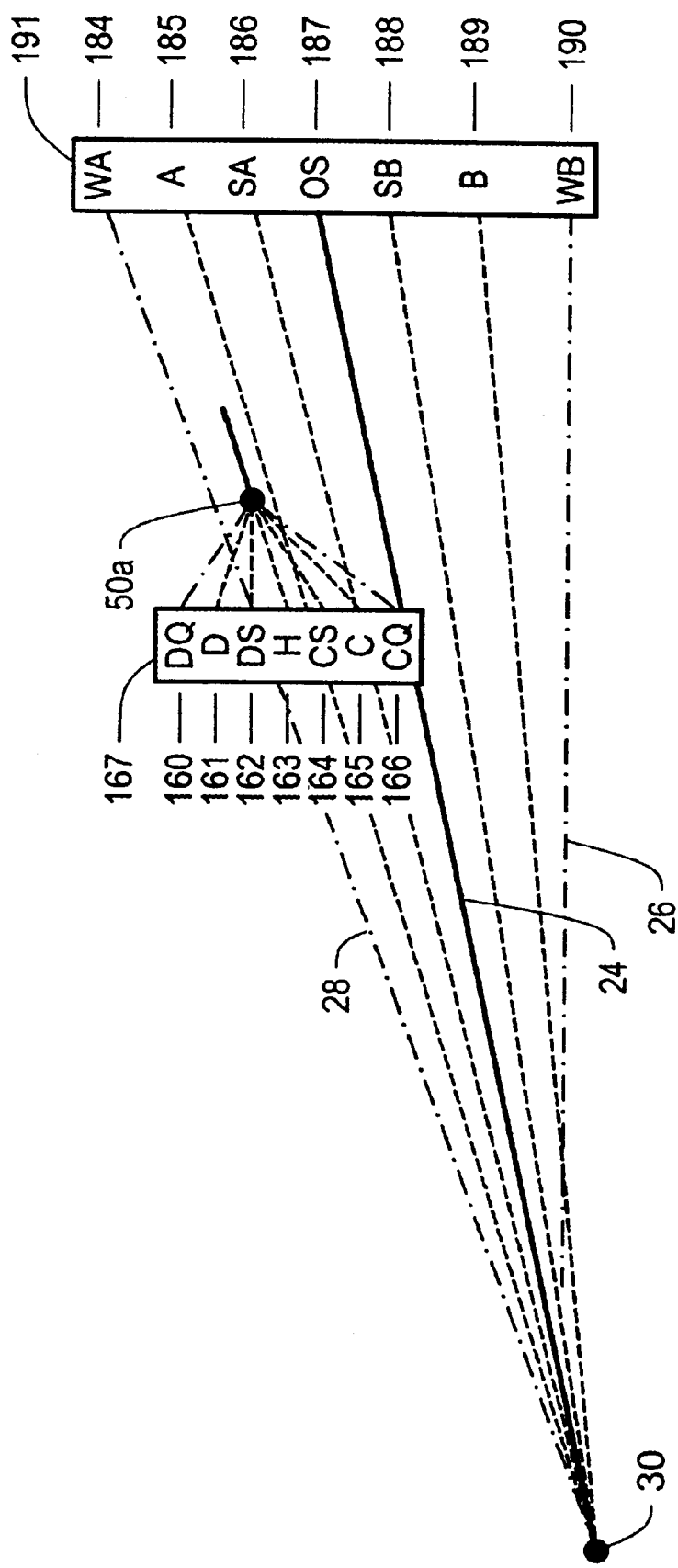
FIG. 5A is a graphical depiction of elevation ranges in relation to the landing glide slope in accordance with this invention.

FIG. 5A depicts exemplary elevation ranges 191 and elevation rate ranges 167 in relation to the optimal landing glide slope 24 of aircraft track symbol 50a. Ranges 184–190 correspond to ranges of Table 1 and ranges 160–166 correspond to those of Table 2. In an exemplary system, the elevation "above" ranges 184–186 are symmetrical with the "below" ranges 188–190 about the "on slope" (OS) range 187. Also in the exemplary system, the elevation rate "converging" ranges 164–166 are symmetrical with the "diverging" ranges 160–162 about the "holding" (H) range 163. In should be recognized by one of ordinary skill in the art that any elevation and elevation rate ranges, whether symmetrical or not, are possible with the present invention. It should further be recognized by one of ordinary skill in the art that these elevation ranges can be presented on the radar display.

For example, the aircraft track symbol 50a is depicted at an elevation above range A 185. If it is on a heading corresponding to direction (rate) H 163, the synthesized voice flight instruction for elevation and elevation rate will be "above, holding."

Figure 5B:
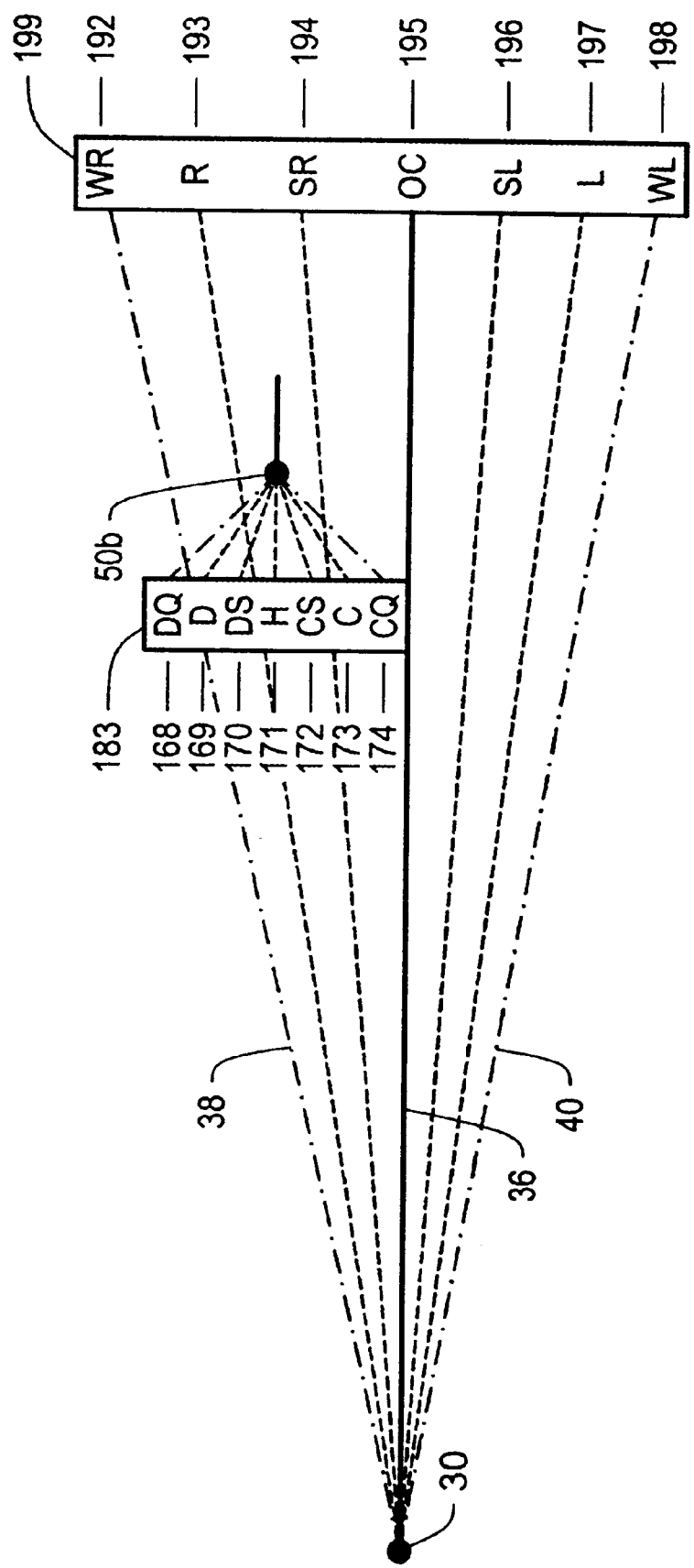
FIG. 5B is a graphical depiction of azimuth ranges in relation to the landing course line in accordance with this invention.

FIG. 5B depicts exemplary azimuth ranges 199 and azimuth rate ranges 183 in relation to the optimal landing course line 36 of aircraft track symbol 50b. Azimuth ranges 199 correspond to ranges of Table 3 and azimuth rate ranges 183 correspond to those of Table 4. In an exemplary system, the azimuth "right" ranges 192–194 are symmetrical with the "left" ranges 196–198 about the "on course" (OC) range 195. Also in the exemplary system, the azimuth rate "converging" ranges 172–174 are symmetrical with the "diverging" ranges 168–170 about the "holding" (H) range 171. In should be recognized that any azimuth and azimuth rate ranges, whether symmetrical or not, are possible with the present invention. It should further be recognized that these azimuth ranges can be presented on the radar display.

For example, the aircraft track symbol 50b is depicted at an azimuth position beyond range SR 194. If it is on a heading corresponding to direction (rate) DS 170, the synthesized voice flight instruction for azimuth and azimuth rate will be "slightly right, diverging slowly."

Figure 6:
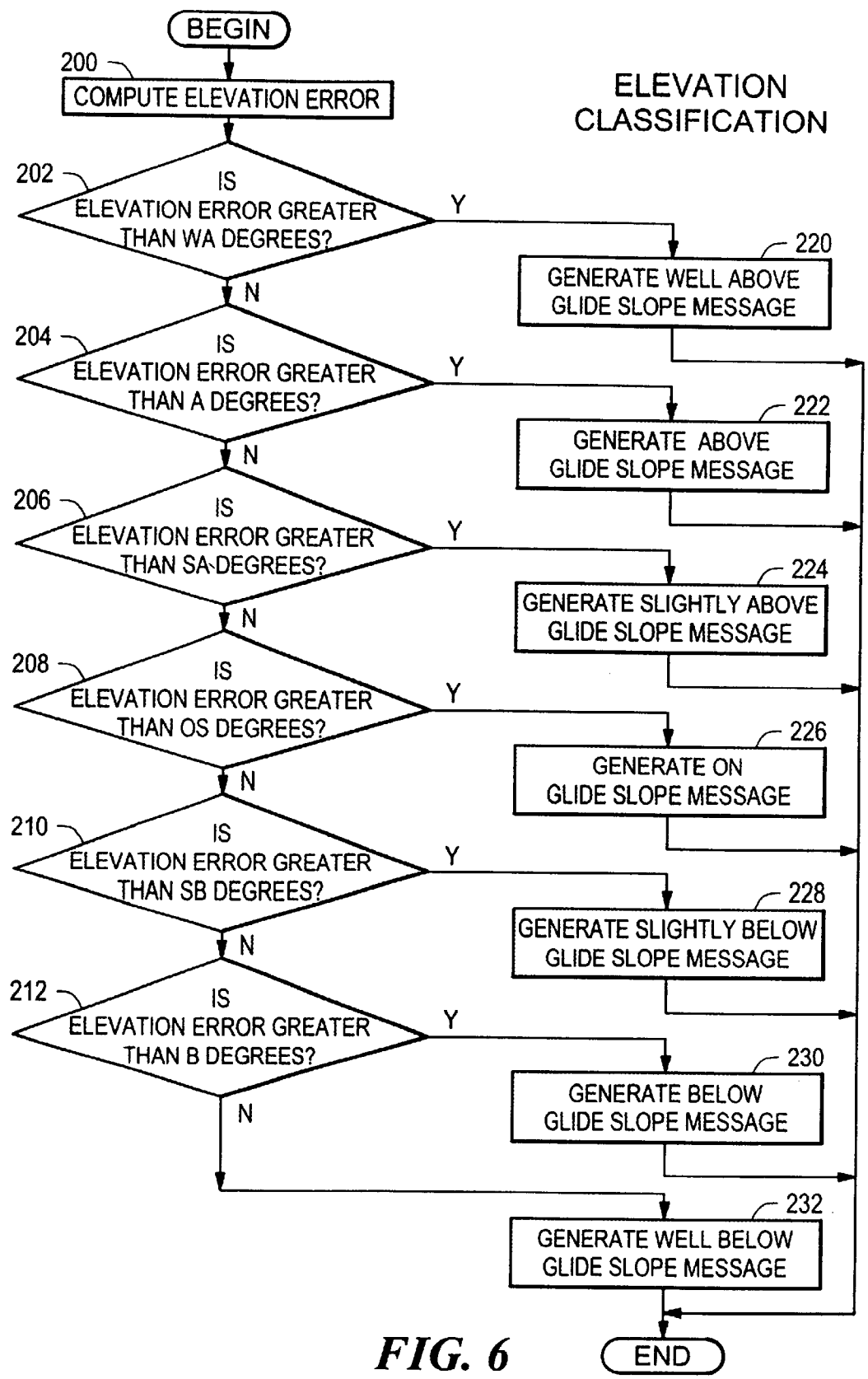
FIG. 6 is a flow diagram showing an exemplary sequence of steps for elevation classification sub-type message generation in accordance with this invention.

FIG. 6, in combination with FIG. 5A shows an exemplary sequence of steps for providing elevation computer generated pilot instructions in accordance with the present invention. In step 200, the elevation angular error is computed from the radar returns as the aircraft elevation minus the optimal landing path elevation 24. A positive elevation error corresponds to an aircraft elevation that is above the optimal landing glide slope 24. In step 202 it is determined whether the aircraft's elevation error is greater than WA degrees above the optimal glide slope 24. In the case where the WA relative elevation is exceeded, the flight instruction generator 122 generates a "well above glide slope" message in step 220 that is transmitted to the pilot. The flight instruction generator 122 makes a series of similar range decisions in steps 202–212. Where the aircraft elevation error 200 crosses a range 202–212, the flight instruction generator synthesizes a corresponding voice phrase in steps 220–232. The voice phrases correspond to the conventional sub-classifications of Table 1. Exemplary elevation lower range limits are shown in Tables 5.

TABLE 5

Exemplary Elevation Classification Limits

| Elevation Sub-Classification | Elevation Error Lower Range Limit |
| --- | --- |
| Well Above Glide Slope | WA = 0.25 degrees |
| Above Glide Slope | A = 0.15 degrees |
| Slightly Above Glide Slope | SA = 0.05 degrees |
| On Glide Slope | OS = −0.05 degrees |
| Slightly Below Glide Slope | SB = −0.15 degrees |
| Below Glide Slope | B = −0.25 degrees |
| Well Below Glide Slope | WB = No lower limit |

Figure 7:
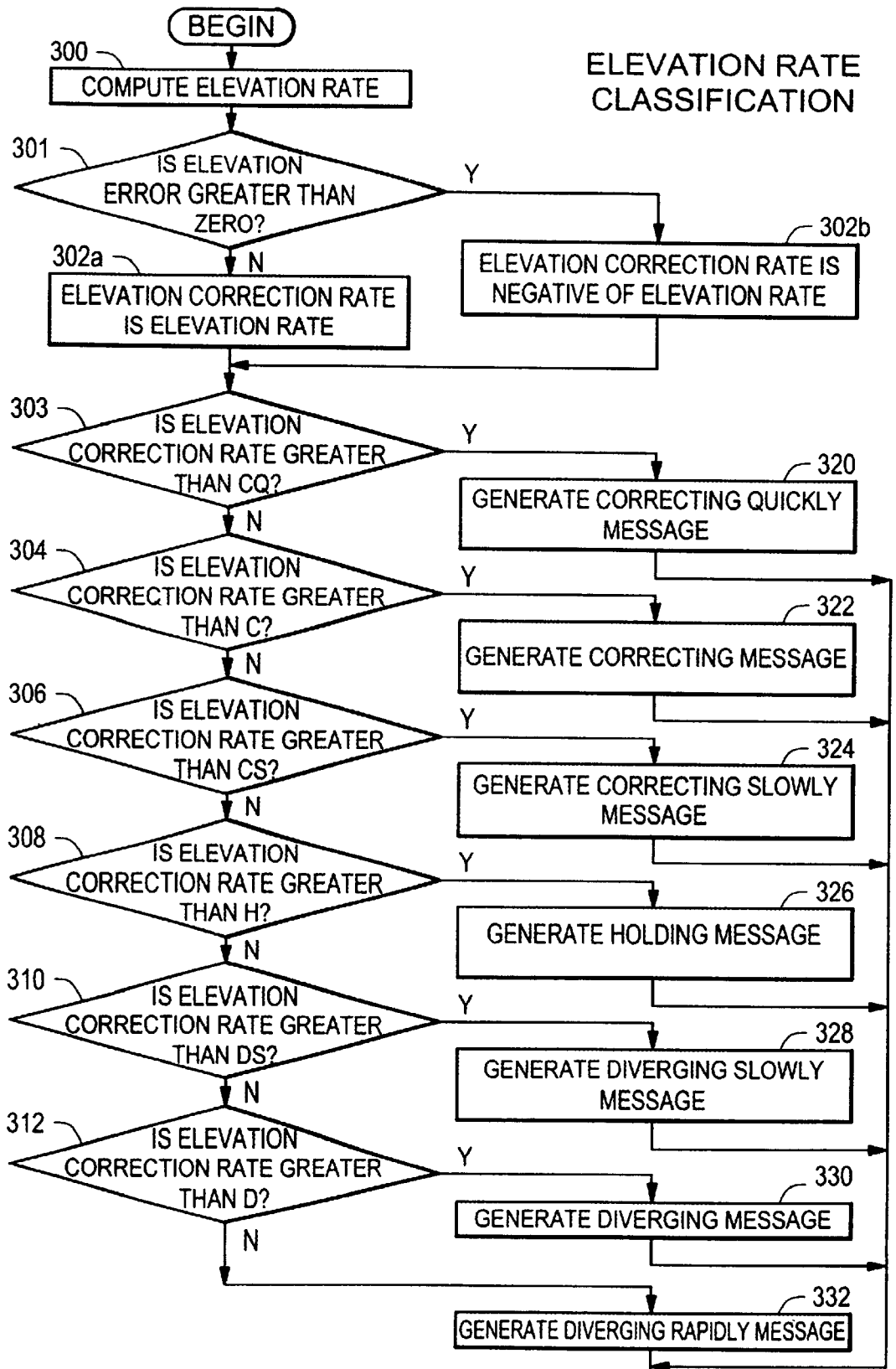
FIG. 7 is a flow diagram showing an exemplary sequence of steps for elevation rate classification sub-type message generation in accordance with this invention.

FIG. 7, in combination with FIG. 5A shows an exemplary sequence of steps for providing elevation rate computer generated pilot instructions in accordance with the present invention. In step 300, the elevation angular rate is computed with the optimal touchdown point 30 as the origin. In step 301, the current elevation error is examined. As mentioned above, a positive elevation error corresponds to an aircraft elevation that is above the optimal landing glide slope 24. A positive elevation rate corresponds to increasing elevation. If the aircraft is above the optimal landing glide slope 24, a negative elevation rate indicates a positive elevation correction rate 302b, and the aircraft is converging on the optimal landing glide slope. If the aircraft is below the optimal landing glide slope 24, a positive elevation rate indicates a positive elevation correction rate 302a, and again the aircraft is converging. In step 303 it is determined whether the aircraft's elevation correction rate is converging at greater than CQ to the optimal landing glide slope 24. In the case where the CQ rate is exceeded, the flight instruction generator 122 generates a "correcting quickly" message in step 320 that is transmitted to the pilot. The flight instruction generator 122 makes a series of range decisions in steps 303–312. Where the determined aircraft elevation correction rate 300 crosses a range 303–312, the flight instruction generator synthesizes a corresponding voice phrase in steps 320–332. The voice phrases correspond to the conventional sub-classifications of Table 2. Exemplary elevation correction rate lower range limits are shown in Tables 6.

TABLE 6

Exemplary Elevation Rate Classification Limits

| Elevation Rate Sub-Classification | Elevation Correction Rate Lower Range Limit |
| --- | --- |
| Correcting Quickly | CQ = 0.05 degrees/sec |
| Correcting | C = 0.025 degrees/sec |
| Correcting Slowly | CS = 0.01 degrees/sec |
| Holding | H = −0.01 degrees/sec |
| Diverging Slowly | DS = −0.025 degrees/sec |
| Diverging | D = −0.05 degrees/sec |
| Diverging Quickly | DQ = No lower limit |

Note that the elevation correction rate ranges of Tables 6 indicate angular elevation correction rate ranges with the touchdown point 30 as the origin. However, FIG. 5A indicates angular elevation correction rate ranges 167 with the aircraft 50*a* as the origin for conceptual clarity.

Figure 8:
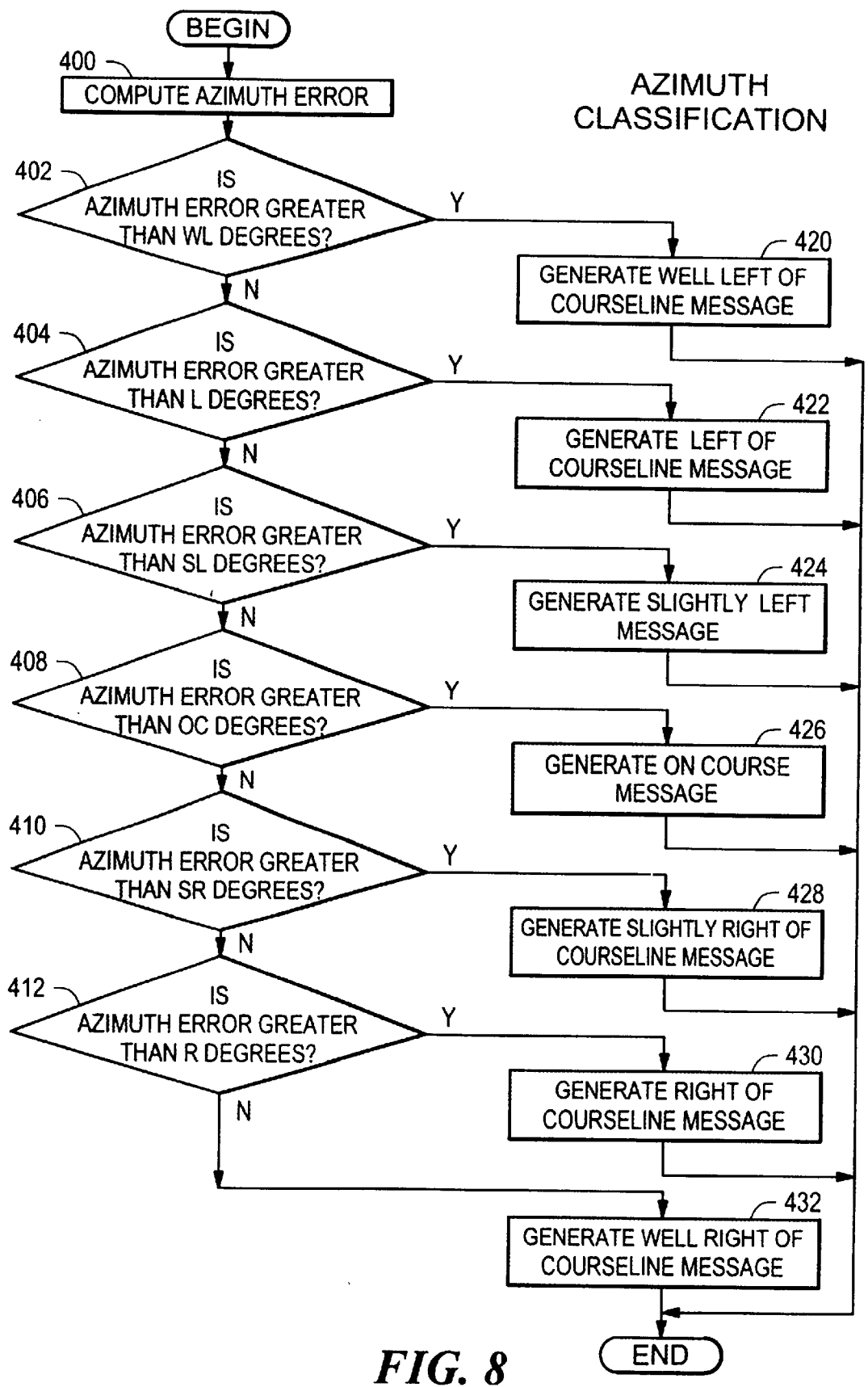
FIG. 8 is a flow diagram showing an exemplary sequence of steps for azimuth classification sub-type message generation in accordance with this invention.

FIG. 8, in combination with FIG. 5B shows an exemplary sequence of steps for providing azimuth position computer generated pilot instructions in accordance with the present invention. In step 400, the azimuth error is computed from the radar returns as the aircraft azimuth position minus the optimal landing path 36. A positive azimuth error corresponds to the aircraft being to the left of the optimal landing course heading 36. In step 402 it is determined whether the aircraft's azimuth error is greater than WL degrees to the left of the optimal glide course heading 36. In the case where WL degrees is exceeded, the flight instruction generator 122 generates a "well left of course line" message 420 that is transmitted to the pilot. The flight instruction generator 122 makes a series of range decisions in steps 402–412. Where the determined aircraft azimuth error 400 crosses a range 402–412, the flight instruction generator synthesizes a corresponding voice phrase in steps 420–432. The voice phrases correspond to the conventional sub-classifications of Table 3. Exemplary azimuth error lower range limits are shown in Table 7.

TABLE 7

Exemplary Azimuth Classification Limits

| Azimuth Sub-Classification | Azimuth Error Lower Range Limit |
| --- | --- |
| Well Left of Course Line | WL = 0.25 degrees |
| Left of Course Line | L = 0.15 degrees |
| Slightly Left of Course Line | SL = 0.05 degrees |
| On Course Line | OC = −0.05 degrees |
| Slightly Right of Course Line | SR = −0.15 degrees |
| Right of Course Line | R = −0.25 degrees |
| Well Right of Course Line | WR = No lower limit |

Figure 9:
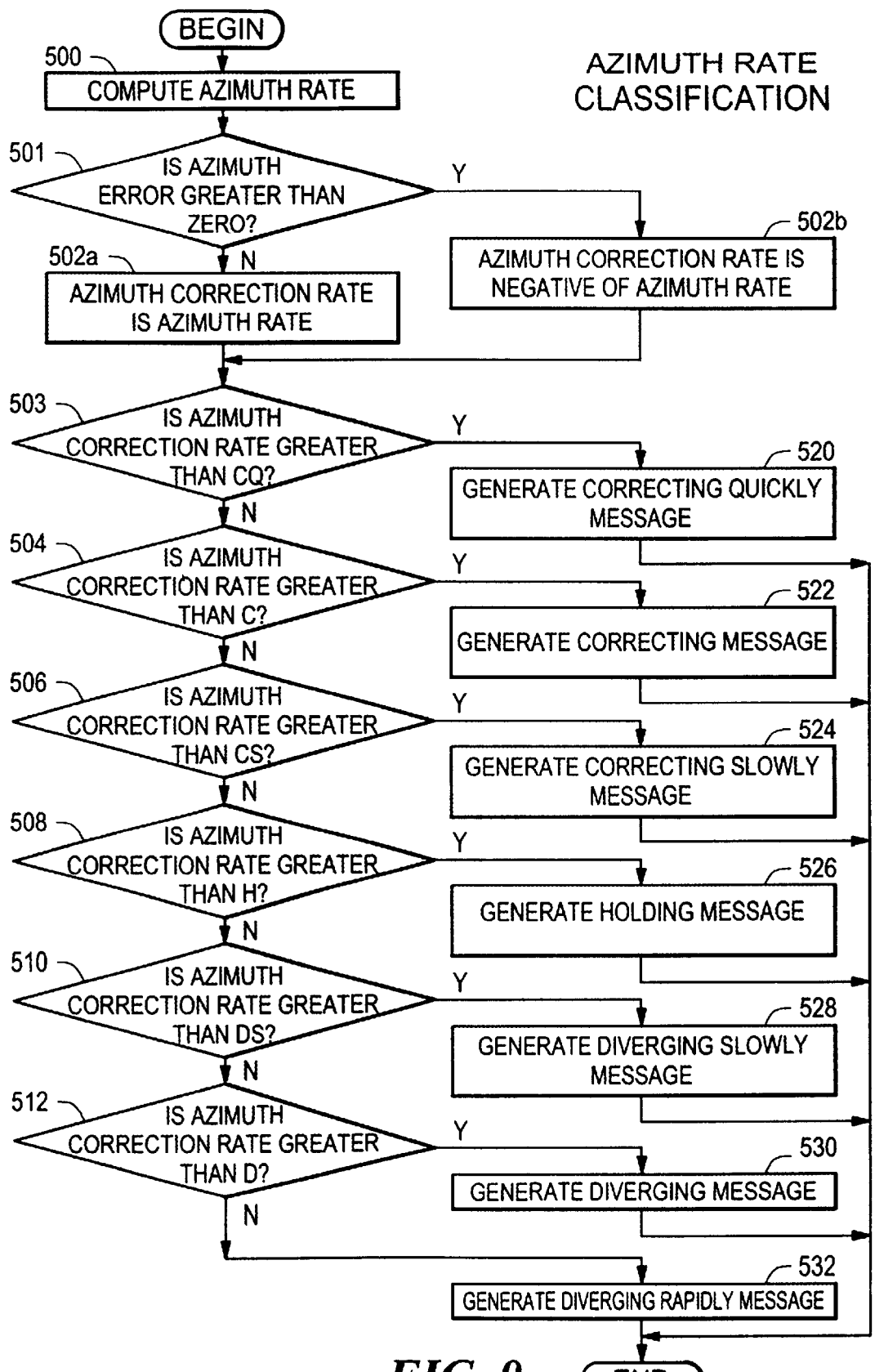
FIG. 9 is a flow diagram showing an exemplary sequence of steps for azimuth rate classification sub-type message generation in accordance with this invention.

FIG. 9, in combination with FIG. 5B shows an exemplary sequence of steps for providing azimuth rate computer generated pilot instructions in accordance with the present invention. In step 500, the azimuth rate is computed. In step 501, the current azimuth error is examined. As mentioned above, a positive azimuth error corresponds to the aircraft being to the left of the optimal landing course heading 36. If the azimuth error is positive, a negative azimuth rate indicates a positive azimuth correction rate 502*b*, and the aircraft is converging upon the optimal landing course heading. If the error is negative, a positive azimuth rate indicates a positive azimuth rate of correction 502*a*, and again the aircraft is converging. In step 503 it is determined whether the aircraft's azimuth correction rate is converging at greater than CQ to the optimal landing course line 36. In the case where the CQ rate is exceeded, the flight instruction generator 122 generates a "correcting quickly" message in step 520 that is transmitted to the pilot. The flight instruction generator 122 makes a series of range decisions in steps 503–512. Where the determined aircraft azimuth correction rate 500 crosses a range 503–512, the flight instruction generator synthesizes a corresponding voice phrase in steps 520–532. The voice phrases correspond to the conventional sub-classifications of Table 4. Exemplary azimuth correction rate lower range limits are shown in Table 8.

TABLE 8

Exemplary Azimuth Rate Classification Limits

| Azimuth Rate Sub-Classification | Azimuth Correction Rate Lower Range Limit |
| --- | --- |
| Correcting Quickly | CQ = 0.05 degrees/sec |
| Correcting | C = 0.025 degrees/sec |
| Correcting Slowly | CS = 0.01 degrees/sec |
| Holding | H = −0.01 degrees/sec |
| Diverging Slowly | DS = −0.025 degrees/sec |
| Diverging | D = −0.05 degrees/sec |
| Diverging Quickly | DQ = No lower limit |

Note that the azimuth correction rate ranges of Tables 8 indicate azimuth correction rate angular ranges with the touchdown point 30 as the origin. However, FIG. 5B indicates azimuth correction rate angular ranges 183 with the aircraft 50*b* as the origin for conceptual clarity.

It will be understood by one of ordinary skill in the art that the instructions provided to the pilot can take a variety of formats including voice, visual and sound signals. For example, the automatically generated instructions can be provided as signals that light various cockpit indicators corresponding to the tags and classifications described above.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for automatically providing flight instructions to a pilot for landing an aircraft, comprising:
   determining spatial information at a radar station that corresponds to a spatial difference between the position of the aircraft and an optimal landing flight path;
   converting the spatial information to synthesized voice flight instructions wherein the converting includes:
      generating a plurality of classification types associated with the spatial difference between the position of the aircraft and an optimal landing flight path; and
      generating the synthesized voice flight instructions from predetermined messages corresponding to respective ones of the plurality of classification types; and
   conveying the flight instructions to the pilot for instructing the pilot to correct the actual landing flight path to the optimal landing flight path.

2. The method of claim 1, wherein the synthesized voice flight instructions communicate the position of the aircraft relative to the optimal landing flight path.

3. The method of claim 2, wherein a language of the synthesized voice flight instructions is selectable.

4. The method of claim 1, wherein the synthesized voice flight instructions further communicate turn and elevation changes that can be made by the pilot to bring the position of the aircraft into conformance with the optimal landing flight path.

5. The method of claim 1, wherein conveying the flight instructions comprises:
    encoding the flight instructions to produce encoded flight instructions; and
    decoding the encoded flight instructions to produce decoded flight instructions.

6. The method of claim 1, wherein generating a plurality of classification types comprises:
    generating an azimuth classification type with a plurality of azimuth classification sub-types each of which corresponds to a magnitude of horizontal error from the optimal flight path.

7. The method of claim 6, wherein generating a plurality of classification types further comprises:
    generating an azimuth rate classification type with a plurality of azimuth rate classification sub-types that correspond to magnitude of rate of horizontal error change from the optimal flight path.

8. The method of claim 7, wherein generating a plurality of classification types further comprises:
    generating an elevation classification type with a plurality of elevation classifications sub-types that correspond to magnitude of elevation error from the optimal flight path.

9. The method of claim 8, wherein generating a plurality of classification types further comprises:
    generating an elevation rate classification type with a plurality of elevation rate classification sub-types that correspond to magnitude of elevation rate error from the optimal flight path.

10. The method of claim 1, further comprising:
    conveying a radar system operator's voice, in place of conveying the flight instructions, upon manual override by a radar system operator.

11. The method of claim 1, further comprising:
    converting the spatial information to visual indicators that are placed upon a radar display.

12. An apparatus for automatically generating landing instructions to an aircraft pilot for landing an aircraft, comprising:
    means for computing a spatial difference between the position of the aircraft and an optimal landing flight path;
    means for converting the spatial information to synthesized voice flight instructions, wherein the means for converting includes:
        means for generating a plurality of classification types associated with the spatial difference between the position of the aircraft and an optimal landing flight path; and
        means for providing synthesized voice flight instructions from predetermined messages corresponding to respective ones of the plurality of classification types; and
    means for conveying the flight instructions to the pilot for instructing the pilot to correct the actual landing flight path to the optimal landing flight path.

13. The apparatus of claim 12, wherein the synthesized voice flight instructions communicate the position of the aircraft relative to the optimal landing flight path.

14. The apparatus of claim 13, wherein a language of the synthesized voice flight instructions is selectable.

15. The apparatus of claim 12, wherein the synthesized voice flight instructions further communicate turn and elevation changes that can be made by the pilot to bring the position of the aircraft into conformance with the optimal landing flight path.

16. The apparatus of claim 12, wherein the means for conveying comprises:
    an encoder to encode the flight instructions to produce encoded flight instructions; and
    a decoder for receiving the encoded flight instructions and producing decoded flight instructions.

17. The apparatus of claim 12 wherein the means for generating a plurality of classification types comprises:
    means for generating an azimuth classification type with a plurality of azimuth classification sub-types that correspond to magnitude of horizontal angular error from the optimal flight path.

18. The apparatus of claim 17 the means for generating a plurality of classification types further comprises:
    means for generating an azimuth rate classification type with a plurality of azimuth rate classification sub-types that correspond to magnitude of rate of horizontal angular error change from the optimal flight path.

19. The apparatus of claim 18 wherein the means for generating a plurality of classification types further comprises:
    means for generating an elevation classification type with a plurality of elevation classifications sub-types that correspond to magnitude of elevation error from the optimal flight path.

20. The apparatus of claim 19 wherein the means for generating a plurality of classification types further comprises:
    means for generating an elevation rate classification type with a plurality of elevation rate classification sub-types that correspond to magnitude of elevation rate error from the optimal flight path.

21. The apparatus of claim 12, further comprising:
    means for conveying a radar system operator's voice to the pilot, in place of the flight instructions, upon manual override by a radar system operator.

22. The apparatus of claim 12 further comprising:
    a radar display processor for converting the spatial information to visual indicators that are placed upon a radar display.

* * * * *

UNITED STATES PATENT AND TRADEMARK OFFICE
CERTIFICATE OF CORRECTION

PATENT NO. : 6,600,442 B2
DATED : July 29, 2003
INVENTOR(S) : Yuchoi Francis Lok It is certified that error appears in the above-identified patent and that said Letters Patent is hereby corrected as shown below:

<u>Title page,</u>
Item [57], ABSTRACT,
Line 3, delete "fight path" and replace with -- flight path --.

<u>Column 2,</u>
Line 58, delete "approached" and replace with -- approaches --.

<u>Column 6,</u>
Line 1, delete "1.23" and replace with -- 123 --.
Line 13, delete "though" and replace with -- through --.

<u>Column 7,</u>
Line 16, delete "in that the" and replace with -- in the --.
Line 18, delete "though 4" and replace with -- through 4 --.

<u>Column 9,</u>
Line 56, delete "In" and replace with -- It --.

Signed and Sealed this

Ninth Day of December, 2003

JAMES E. ROGAN
*Director of the United States Patent and Trademark Office*